United States Patent [19]

Berger et al.

[11] Patent Number: 4,818,744

[45] Date of Patent: Apr. 4, 1989

[54] PROCESS FOR THE PRODUCTION OF CATALYZERS AND CATALYZERS FOR THE REMOVAL OF POLLUTING COMPONENTS FROM THE EXHAUST GASES OF INTERNAL COMBUSTION ENGINES

[76] Inventors: Ulf-Michael Berger, Drenker Strasse 29a; Volker Berger, Abgunstweg 14, both of 3472 Beverungen, Fed. Rep. of Germany

[21] Appl. No.: 126,970
[22] PCT Filed: Feb. 26, 1987
[86] PCT No.: PCT/EP87/00115
§ 371 Date: Oct. 15, 1987
§ 102(e) Date: Oct. 15, 1987
[87] PCT Pub. No.: WO87/05231
PCT Pub. Date: Sep. 11, 1987

[30] Foreign Application Priority Data

Feb. 27, 1986 [DE] Fed. Rep. of Germany ....... 3606335

[51] Int. Cl.$^4$ .......................... B01J 21/08; B01J 23/64; B01J 23/72; B01J 23/84
[52] U.S. Cl. ..................................... 502/244; 502/439; 423/213.5
[58] Field of Search ............... 502/252, 324, 244, 439; 423/213.5

[56] References Cited

U.S. PATENT DOCUMENTS 3,894,968 7/1975 Berger et al. ........................ 502/241
3,907,716 9/1975 Haacke ................................ 502/324
3,956,189 5/1976 Warshaw et al. .................... 502/331

FOREIGN PATENT DOCUMENTS 2023813 11/1971 Fed. Rep. of Germany .
2058264 6/1972 Fed. Rep. of Germany .
2161709 7/1973 France .
355308 8/1931 United Kingdom .

*Primary Examiner*—W. J. Shine
*Attorney, Agent, or Firm*—Herbert Dubno

[57] ABSTRACT

The invention relates to a process for the production of a catalyzer and a catalyzer for the removal of polluting components from exhaust gases of internal combustion engines, particularly Otto-engines, by using carrier materials provided with catalytically effective metallic compounds. The catalyzer is not only simple and cost-effective to produce but also is very efficient at removing polluting components from exhaust gases, can be operated with leaded gasoline and has a comparatively long life components of the catalyzer include approx. 22–26% by weight of cobalt oxide, approx. 8–15% by weight manganous oxide, approx. 4–6% by weight copper oxide, approx. 25–35% by weight clay, and approx. 27–35% by weight talc. All these components are first premixed together in a dry powder form, homogenized and brought to the desired final particle size. Subsequently the powder mixture to be plastified is agitaled in a mixer and granulated through a sieve resultant granulate is then pressed into molds to be dried at approx. 50–150 degrees C and then burned at a temperature of approx. 850–900 degrees C.

42 Claims, 2 Drawing Sheets

PROCESS FOR THE PRODUCTION OF CATALYZERS AND CATALYZERS FOR THE REMOVAL OF POLLUTING COMPONENTS FROM THE EXHAUST GASES OF INTERNAL COMBUSTION ENGINES

FIELD OF THE INVENTION

The invention relates to a process for the production of a catalyzer as well as to a catalyzer for the removal of polluting components from the exhaust gases of internal combustion engines, particularly Otto-engines, by using carrier materials provided with catalytically active metallic compounds.

BACKGROUND OF THE INVENTION

It is a known fact that the exhaust gases coming from internal combustion engines contain polluting components, such as CO, NOx, $SO_2$, and others.

In order to remove these components from the exhaust gases of internal combustion engines, a great number of catalyzer types, having the most various compositions, has been proposed. All these known catalyzers have the disadvantage that they can not be operated with leaded gasoline, because the lead content after a short time leads to the destruction of the catalyzer. For this reason, the tendency to use unleaded gasoline has emerged, but this is not appropriate for all engine types existing on the market, particularly not for engines with carburetors. Departing from this state of the art, the invention has the object to create a process for the production of a catlyzer and a catalyzer for the removal of polluting components from exhaust gases of internal combustion engines, by avoiding the aforementioned disadvantages and by establishing a process which is not only simple and cost efficient but also produces a catalyzer which removes the polluting components to a large extent, can be operated with leaded gasoline and has a comparatively long life.

SUMMARY OF THE INVENTION

The invention relates to a process for the production of a catalyzer and a catalyzer for the removal of polluting components from exhaust gases of internal combustion engines, particularly Otto-engines, by using carrier materials provided with catalytically effective metallic compounds. The catalyzer is not only simple and cost-effective to produce but also is very efficient at removing polluting components from exhaust gases, can be operated with leaded gasoline, and has a comparatively long life. Components of the catalyzer include approx. 22-26% by weight of cobalt oxide, approx. 8-15% by weight manganous oxide, approx. 4-6% by weight copper oxide, approx. 25-35% by weight clay, and approx. 27-35% by weight talc. All these components are first premixed together in a dry powder form, homogenized and brought to the desired final particle size. Subsequently the powder mixture to be plastified is agitated in a mixer and granulated through a sieve. Resultant granulate is then pressed into molds to be dried at approx. 50-150 degrees C. and then burned at a temperature of approx. 850-900 degrees C.

BRIEF DESCRIPTION OF THE DRAWING

An embodiment example of the invention is more particularly described with the aid of the drawing, which shows.

A catalyzer plate, having an oval basic shape and provided with a multitude of passage channels 2, is marked with 1. For simplicity, the passage channels 2 are marked only on one fourth of the representation of the catalyzer. The margin of the catalyzer is marked with 3.

Figure 1:
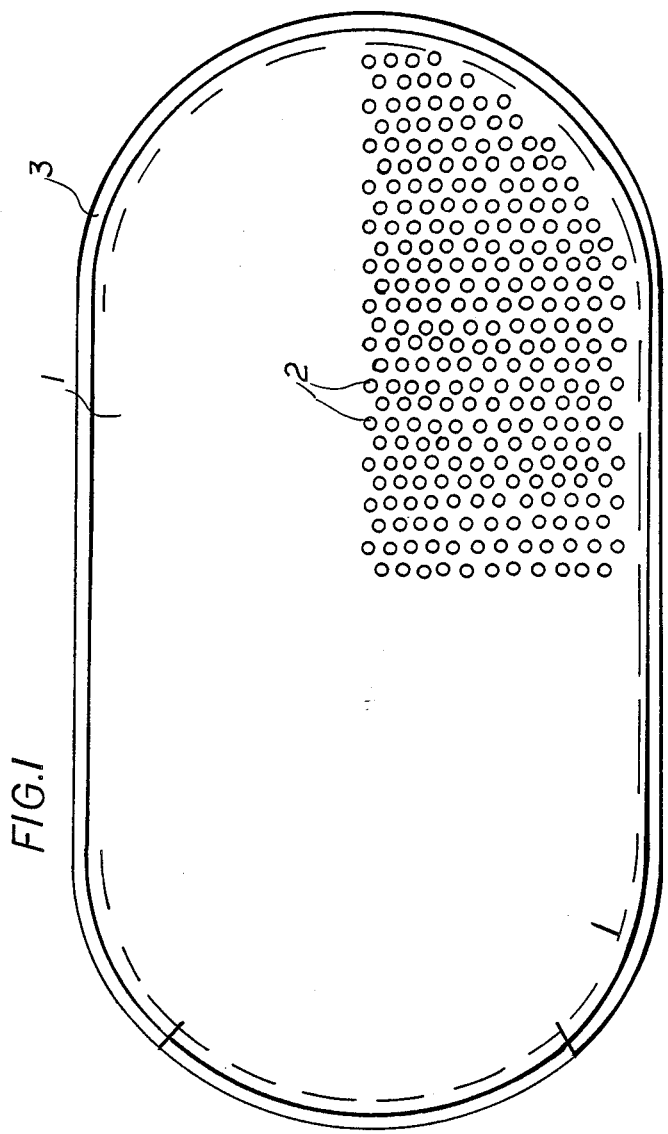
FIG. 1 as a top view of the catalyzer, and
FIG. 2 as a sectioned lateral view.
Figure 2:
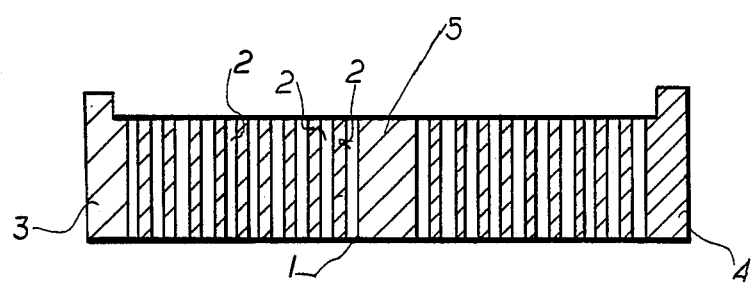

As can be seen particularly from FIG. 2, the margin 3 of the catalyzer protrudes like a collar with respect to the backside of the catalyzer, seen in the direction of the flow, as marked with 4. Within the collar-like protruding margin 4 an after-expansion chamber 5 is created, which contributes to the improvement of the flow conditions of the passing exhaust gases, particularly when several catalyzer plates as seen in FIG. 2 are put together in a catalyzer assembly. In the case of a condensator assembly built in this manner, expansion chambers 5 appear again and again, over its entire length.

The oval configuration of the catalyzer 1 proves to be especially advantageous for mounting underneath the bottom of a motor vehicle or in its engine area.

DETAILED DESCRIPTION

In accordance with the process, the problem is solved by mixing together in dry powder form the following components:
approx. 22-26% by weight cobalt oxide,
approx. 8-15% by weight manganous oxide
approx. 4-6% by weight copper oxide,
approx. 25-35% by weight clay,
approx. 27-35% by weight talc
which are then drily premixed, homogenized and ground to the desired final particle size. The resultant mixture is then plastified in a mixer and granulated by being passed through a sieve, pressed into the desired shape and the pressed molds dried between 50-150 degrees C. Thereafter the dried molds are subjected to a burning temperature of approx. 850-900 degrees C. Production of the catalyzer is extraordinarily simple and comparatively cheap since a mixer and a press are the only required equipment. Premixing of the individual components takes place in a forced mixer to insure an intimate mixing of the individual components. Clay functions herein exclusively as a carrier material. Most preferably is the Warenburger type clay. The talc besides its carrier function serves to impart the proper porosity. Due to the burning process, a high-strength catalyzer is produced with ceramic-like properties and having comparatively a long life span.

The homogenization and the desired final particle size are obtained by means of a counterflow impact pulverizer.

It is also possible to pass to homogenization approx. 50% of the weight of the premixed material and thereafter bring this part together with the remaining premix. This achieves a certain porosity which creates a comparatively larger active surface area.

Plastification of the premix is performed through the addition of oil and distilled water, preferably in the form of an emulsion. Moisture content of the plastified catalyzer mass should reach approx. 40-50%, preferably 42-46%. It has been proven that this moisture content is particularly advantageous for the further processing of the catalyzer mass.

The pressing of the catalyzer mass prepared this way is then carried out with the aid of a steel die on an automatic wet press. A comparatively large number of pieces can thereby be produced in a short time. Advantageously, at the same time with the pressing, a multitude of channels are formed, which seen from the mold in the flow direction of the exhaust gases, traverse the mold from its frontal side to its rear side. For this purpose the upper part of the press is provided with a multitude of freely protruding needles, which when the upper and lower parts of the press are brought together, traverse the catalyzer mass and form thereby the passage channels. However, it is also possible to make the passage channels later, by drilling, stamping, pressing and such. Also, threads can be imbedded in the catalyzer mass, which are then destroyed in the final burning step to provide the desired passage channels.

Drying of the pressed molds is preferably done at a temperature of approx. 100–120 degrees C.

The drying time of the catalyzer mass is approx. 60 minutes. The burning time is approx. 90 min. After the burning, a cooling down to approx. 80 degrees C. takes place in approx. 7–8 hours.

The invention also extends further to a process for the production of a catalyzer whose composition comprises:
approx. 22–26% by weight of cobalt oxide,
approx. 8–15% by weight of manganous oxide,
approx. 4–6% by weight copper oxide,
approx. 25–35% by weight clay,
approx. 27–35% by weight talc,
wherein all components are first drily premixed in powder form, homogenized and brought to the desired final fineness. Thereafter the resultant powder mixture is plastified in a mixer, extruded, and the extruded material then brought to the desired size of the mold. The molds are dried at approx. 50–150 degrees C. and then burned at a temperature of approx. 850–900 degrees C. After their separation, the molds are provided with a plurality of passage channels, which, when seen from the mold in the flow direction of the exhaust gases, traverse the molds from their frontal side to their back sides. These channels can be formed, for instance, through drilling, stamping, pressing, and so on.

The drying time, the burning time, as well as the cooling time are the same as the ones mentioned before.

In order to create a catalyzer which reaches as soon as possible its most favorable operational temperature after a cold start, it is proposed according to the invention to add catalytically highly effective components to the premix powder, such as approx. 0.5% by weight palladium- and/or rhodium- and/or platinum chloride in an aqueous solution. These components increase responsiveness so that the catalyzer reaches its most favorable operational range after a relatively short time.

In the case of catalyzers produced by extrusion, it is possible to treat their surface with a highly effective catalytic aqueous solution of palladium- and/or rhodium- and/or platinum chloride, for instance through dipping, spraying or the like.

In order to remove the nitrogen oxide in accordance with the center of gravity, it is proposed by the invention to employ a composition which comprises:
approx. 34–37% by weight of copper oxide,
approx. 25–35% by weight clay and
approx. 27–35% by weight talc,
wherein all components are first drily premixed in powder form, homogenized and brought to the desired final fineness. Subsequently the powder mixture is plastified in a mixer and passed through a sieve and granulated. Then the granulates are pressed into molds of the desired shape. These pressed molds are then dried at approximately 50–150 degrees C. and after that burnt at a temperature of approx. 850–900 degrees C.

In a catalyzer produced this way, the catalytically effective components consist exclusively of copper oxide, which is highly suited for the removal of nitrogen oxides.

In accordance with the invention, it is further proposed that approx. 34–37% by weight copper oxide, approx. 25–35% by weight clay and approx. 27–35% by weight talc be drily premixed in powder form, homogenized and brought to the desired final fineness. Thereafter, the powder mixture is plastified in a mixer, extruded and the extrusion product formed into the desired size in a mold. The molds are then dried at approx. 50–150 degrees C. They are subsequently burned at a temperature of approx. 850–900 degrees C. Introduction of the additional catalytically highly-effective components in the form of aqueous solutions can be done before or after the heat treatment, through dipping, injecting or the like. It is also possible to simultaneously extract by vacuum the air existing in the pores and/or channels, and to fill the catalytically effective solution into these hollow spaces.

The particle size of the introduced talc is 6 according to Hegmann. The particle size of the introduced talc presents a maximal grain size of 20 microns, whereby 97% by weight have a grain size under 10 microns and 50% by weight a grain size under 2 microns.

The added fine ground clay has a particle size of maximum 90 microns with the following size distribution:
+200 mesh 0.1%
−200 mesh 99.9%
−400 mesh 99.0%.

The added copper oxide has a residue of maximum 2% by weight over 0.063 mm/mesh width.

The manganous oxide has a particle size of 90% din 120=0.045 mm.

The invention further extends to a catalyzer for the removal of polluting components from the exhaust gases of an internal combustion engine, which consists of carrier materials provided with catalytically effective metallic compounds.

Advantageously a catalyzer is built so that it comprises
approx. 22–26% by weight cobalt oxide,
approx. 8–15% by weight manganous oxide,
approx. 4–6% by weight copper oxide,
approx. 25–35% by weight clay and
approx. 27–35% by weight talc.

Based on this composition, the catalyzer proves to be extremely stable thereby meeting government emission standards. In addition, this catalyzer is insensitive towards lead, so that the thereto pertaining internal combustion engine can also be run with leaded gasoline, which is of considerable importance particularly for the supplementary equipment.

Catalyzers having the following composition have proven to be particularly advantageous:

EXAMPLE 1

243.13 parts by weight cobalt oxide
141.73 parts by weight manganous oxide,
54.31 parts by weight copper oxide,
264.66 parts by weight clay and
296.16 parts by weight talc.

EXAMPLE 2

244.31 parts by weight cobalt oxide,
142.73 parts by weight manganous oxide,
55.31 parts by weight copper oxide,
263.16 parts by weight clay and
294.66 parts by weight talc.

For the responsiveness of the catalyzer, especially after a cold start, it is advantageous to add to the catalyzer mass already when the initial mixture is prepared approx. 0.5% by weight of palladium- and/or rhodium- and/or platinum chloride in aqueous solution, or to treat the molds before the heat treatment of the finished catalyzers with such a solution.

The invention extends further to a catalyzer preferably for the removal of nitrogen oxides from the exhaust gases of internal combustion engines.

In this type of catalyzer, only copper oxide is used as the catalytically effective component, namely with approx. 34–37% by weight, while the percentage by weight of the already indicated carrier materials remains unchanged.

Advantageously, such a catalyzer suited especially for the removal of NOx-components of the combustion gases is arranged before a catalyzer of the afore-described type with the afore-indicated catalytically effective components, so that the nitrogen oxides are completely removed. In this case it has proven advantageous to connect the intermediate space between the two catalyzers made of different components to an air supply, so that enough air is available for the required oxidation. For the catalyzer arranged upstream with copper oxide as an effective component, the residue of oxygen in the combustion gases is sufficient to perform an unobjectionable oxidation thereby obviating a need for an external air supply.

The catalyzers according to the invention, irrespective of their precise composition, are preferably provided with a multitude of passage channels, transversing in the flow direction of the exhaust gases, from their front side to their back side. This way a comparatively large catalytic surface results, which leads to a very high degree of efficiency.

The passage channels are partially or totally provided with an internal thread of the kind found in a rifled barrel. Due to this spiral thread a twist is imparted to the exhaust gases. Thereby their residence time is prolonged in the catalyzer further enhancing effectiveness. The inner thread can be made, for instance, with the aid of outer threads on needles which are rotatably supported at one of their ends. When the needles are extracted after forming the passage channels, they can be rotated and thereby trace the inner thread.

Advantageously, the inlet- and outlet openings of the channels are funnel-shaped. At the inlet end, this leads to an enlargement of the active surfaces, while at the outlet end the expansion effect sets in earlier, so that altogether the effectiveness of the catalyzer is further improved.

Due to the use of talc a certain porosity results, which makes possible the throughflow of gases. In order to achieve optimal flow conditions, the catalyzer with passage channels is preferably used, since these can be traversed by the exhaust gases without a considerable slow-down of the flow and still perform the desired catalytic effect.

Catalyzer according to the invention can be made in one piece. However, it has proven to be particularly advantageous to make it from plates, since then only with the help of a tool, catalyzers for various types of engines can be produced. For this purpose, several plates can be connected into a catalyzer assembly, for instance by using a highly heat-resistant adhesive and/or temperatures of 1500–1600 degrees C. Such adhesives are the so-called ceramic adhesives.

According to a further feature of the invention, the catalyzer or its plates have on their respective backside, when seen in the flow direction of the exhaust gases, a margin protruding oppositely to the back side. Due to the margin after-expansion chambers are created which have a favorable influence on the flow conditions, particularly by preventing the flow from passing too quickly through the pores, capillaries, the passage channels and the like.

In order to insure that the catalyzer operates in its most favorable temperature range, it it surrounded on an outside surface by a mat of highly temperature-stable material. A cerafeld mat of, for instance, 2 mm thickness is particularly suited, this being fully effective up to temperatures of 1600 degrees C. Besides, this insulation mat prevents the heat transfer to the neighboring parts of the vehicle, particularly the exhaust system.

Depending on the kind of engine used in the vehicle and the location of the catalyzer, it can prove to be advantageous for the operation of the catalyzer to supply additional air thereto. This is done by supplying air to the catalyzer of the invention, this air being preferably added depending on the number of rotations of the engine, so that a desired air excess is insured for all stages of motion, as well in all types of catalyzer arrangement.

Due to the proposed plate construction of the individual catalyzers used for the formation of a general catalyzer, it is possible to combine catalyzers of various compositions according to the invention to create the optimal catalyzer type for each type of engine.

We claim:

1. A process for production of a catalyzer for removal of polluting components from exhaust gases of an internal combustion engine by using carrier materials provided with catalytically effective metallic compounds, said carrier materials comprising the components of:

approx. 22–26% by weight cobalt oxide,
   approx. 8–15% by weight manganous oxide,
   approx. 4–6% by weight copper oxide,
   approx. 25–35% by weight clay,
   approx. 27–35% by weight talc, and wherein said catalyzer is prepared by the steps comprising:
   (a) drily premixing together all of said components in powder form;
   (b) homogenizing said powder mixture to achieve a desired final size;
   (c) agitating said homogenized powder in a mixer to achieve plastification and thereafter passing the resultant particles through a sieve for granulation into granules;
   (d) pressing said granules into molds to achieve a desired shape;
   (e) drying said molds of pressed granules at a temperature of approximately 50° to 150° C.; and
   (f) burning said dried molded pressed granules at a temperature ranging from approximately 850° to 900° C.

2. Process according to claim 1, wherein the premixing takes place in a forced mixer.

3. Process according to claim 1, wherein the homogenization and achieving of said final desired particle size are performed with the aid of a counterflow impact pulverizer.

4. Process according to claim 1 wherein about 50% by weight of the premixed material is passed on for homogenization and after that mixed again with any remaining amount of the premix.

5. Process according to claim 1 wherein said agitated powder mixture is plastified by adding oil and distilled water in the form of an emulsion.

6. Process according to claim 1, wherein the plastified powder has a moisture content of about 40-50%.

7. Process according to claim 1, wherein said pressing is done with the aid of a steel die on an automatic wet press.

8. Process according to claim 1 comprising the further step of imprinting of a multitude of passage channels simultaneously with said pressing step, said channels traversing the mold from a frontal side to a backside of said mold, the mold being seen in a flow direction of the exhaust gases.

9. Process according to claim 1 wherein the drying of the pressed molds takes place at a temperature of about 100-120 degrees C.

10. Process according to claim 1 wherein the drying time is about 60 minutes.

11. Process according to claim 1 wherein the burning time is about 90 minutes.

12. Process according to claim 1 further comprising after the burning step a cooling down step to about 80 degrees C. in about 7-8 hours.

13. A process for the production of a catalyzer for removal of polluting components from exhaust gases of internal combustion engines by using carrier materials provided with catalytically effective metallic compounds, said carrier materials comprising the compounds of:
approx. 22-26% by weight cobalt oxide,
approx. 8-15% by weight manganous oxide,
approx. 4-6% by weight copper oxide,
approx. 25-35% by weight clay,
approx. 27-35% by weight talc, and wherein said catalyzer is prepared by the steps comprising:
(a) drily premixing together all of said components in powder form;
(b) homogenizing said powder mixture to achieve a desired final size;
(c) agitating said homogenized powder in a mixer to achieve plastification;
(d) extruding said agitated mixture;
(e) conforming said extruded mixture to a mold of a desired shape;
(f) drying said molds with extruded product at a temperature of about 50° to 150° C.; and
(g) burning said dried extruded molds at a temperature of approximately 850° to 900° C.

14. Process according to claim 13, further comprising the step of separating the molds and after separation, providing said molds with a plurality of channels traversing the molds from respective frontal sides to respective backsides of said molds, seen from the molds in a flow direction of the exhaust gases.

15. Process according to claim 13 wherein the drying of the conformed molds is performed at a temperature of about 100-120 degrees C.

16. Process according to claim 13 wherein the drying time is about 60 minutes.

17. Process according to claim 13 wherein the burning time is about 90 minutes.

18. Process according to claim 13 further comprising after the burning a cooling down to a temperature of about 80 degrees C. in about 7-8 hours.

19. Process according to claim 1 further comprising adding to the powder premix about 0.5% by weight of said metallic compounds selected from the group consisting of palladium-, rhodium-, and platinum chloride, as additional highly effective catalytic components.

20. Process according to claim 1 further comprising the step of treating a surface of the catalyzer with a highly-effective catalytic aqueous solution of said metallic compounds selected from group consisting of palladium-, rhodium-, and platinum chloride.

21. A process for the production of a catalyzer for the removal of polluting components from nitrogen oxide exhaust gases of internal combustion engines, said catalyzer comprising the components of:
approx. 34-37% by weight of copper oxide,
approx. 25-35% by weight of clay,
approx. 27-35% by weight of talc, and
wherein said catalyzer is prepared by the steps comprising:
(a) drily premixing together all of said components in powder form;
(b) homogenizing said powder mixture to achieve a desired final size;
(c) agitating said homogenized powder in a mixer to achieve plastification and thereafter passing the resultant particles through a sieve for granulation into granules;
(d) pressing said granules into molds to achieve a desired shape;
(e) drying said molds of pressed granules at a temperature of approximately 50° to 150° C.; and
(f) burning said dried pressed molded granules at a temperature ranging from approximately 850° to 900° C.

22. A process for the production of a catalyzer for the removal of polluting components from nitrogen oxide exhaust gases of internal combustion engines, said catalyzer comprising the components of:
approx. 34-37% by weight of copper oxide,
approx. 25-35% by weight of clay,
approx. 27-35% by weight of talc, and
wherein said catalyzer is prepared by the steps comprising:
(a) drily premixing together all of said components in powder form;
(b) homogenizing said powder mixture to achieve a desired final size;
(c) agitating said homogenized powder in a mixer to achieve plastification;
(d) extruding said agitated mixture;
(e) conforming said extruded mixture to a mold of a desired shape;
(f) drying said molds with extruded product at a temperature of about 50° to 150° C.; and
(g) burning said dried extruded molds at a temperature of approximately 850° to 900° C.

23. Process according to claim 1 where the talc introduced as a starting component has a particle size that equals 6 according to the Hegmann scale.

24. Process according to claim 23 wherein the particle size of the introduced talc has a grain size of maximum 20 microns, whereby 97% by weight has a grain size under 10 microns, and 50% by weight has a grain size of under 2 microns.

25. Process according to claim 1 wherein the clay introduced as a starting component has a particle size of max. 90 microns.

26. Process according to claim 1 wherein the cobalt oxide introduced as a starting component has the following particle size:
+200 mesh 0.1%
−200 mesh 99.9%
−400 mesh 99.0%.

27. Process according to claim 1 wherein the copper oxide introduced as a starting component has a residue of max. 2% by weight at 0.063 mm/mesh width.

28. Process according to claim 1 wherein the manganous oxide has a particle size of 90% by weight Din 120=0.045 mm.

29. A catalyzer for the removal of polluting components from the exhaust gases of internal combustion engines comprising carrier materials provided with catalytically active metallic compounds, particularly produced in accordance with claim 1 wherein said carrier materials comprise:
approx. 22–26% by weight cobalt oxide,
approx. 8–15% by weight manganous oxide,
approx. 4–6% by weight copper oxide,
approx. 25–35% by weight clay, and
approx. 27–35% by weight talc.

30. Catalyzer according to claim 29, wherein the carrier material has the following composition:
243.13 parts by weight cobalt oxide,
141.73 parts by weight manganous oxide,
54.31 parts by weight copper oxide,
264.66 parts by weight clay, and
296.16 parts by weight talc.

31. Catalyzer according to claim 29, wherein the carrier material has the following composition:
244.31 parts by weight cobalt oxide,
142.73 parts by weight manganous oxide,
55.31 parts by weight copper oxide,
263.16 parts by weight clay, and
294.66 parts by weight talc.

32. Catalyzer according to claim 1 wherein the carrier material comprises:
approx. 22–26% by weight cobalt oxide,
approx. 8–15% by weight manganous oxide,
approx. 4–6% by weight copper oxide,
approx. 0.5% by weight of said metallic compound selected from the group consisting of palladium-, rhodium, and platinum chloride,
approx. 25–35% by weight clay, and
approx. 27–35% by weight talc.

33. Catalyzer for the removal of polluting components from nitrogen oxide exhaust gases of internal combustion engines comprising carrier materials provided with catalytically effective metallic compounds, said carrier materials comprising:
approx. 34–37% by weight copper oxide,
approx. 25–35% by weight clay, and
approx. 27–35% by weight talc,
and wherein said catalyzer is prepared by the steps comprising:
(a) drily premixing together all of said components in powder form;
(b) homogenizing said powder mixture to achieve a desired final size;
(c) agitating said homogenized powder in a mixer to achieve plastification and thereafter passing the resultant particles through a sieve for granulation into granules;
(d) pressing said granules into molds to achieve a desired shape;
(e) drying said molds of pressed granules at a temperature of approximately 50° to 150° C.; and
(f) burning said dried molded pressed granules at a temperature ranging from approximately 850° to 900° C.

34. Catalyzer according to claim 1 further comprising a multitude of passage channels which traverse the molded carrier materials from a frontal side to a backside thereof, seen in a flow direction of the exhaust gases.

35. Catalyzer according to claim 34, wherein the channels are provided at least partially with inner threadings.

36. Catalyzer according to claim 34 wherein the channels have funnel-shaped inlet- and outlet openings.

37. Catalyzer according to claim 1 produced as a unitary piece.

38. Catalyzer according to claim 1 comprising plates.

39. Catalyzer according to claim 38 wherein several plates are combined into a catalyzer assembly.

40. Catalyzer according to claim 38 wherein the plates have on a backside thereof seen in a flow direction of the exhaust gases a margin protruding oppositely to the backside.

41. Catalyzer according to claim 1 surrounded on an outside surface by a mat made of highly heat-stable material.

42. Catalyzer according to claim 1 wherein to the exhaust gases passing through the catalyzer, air is added in dependence from a rotational speed of the engine.

* * * * *